US011249496B1

(12) United States Patent
Etxeandia Gartziaetxabe

(10) Patent No.: US 11,249,496 B1
(45) Date of Patent: Feb. 15, 2022

(54) GAS PRESSURE REGULATOR VALVE

(71) Applicant: COPRECI, S.COOP., Aretxabaleta (ES)

(72) Inventor: Roberto Etxeandia Gartziaetxabe, Aretxabaleta (ES)

(73) Assignee: COPRECI, S.COOP., Aretxabaleta (ES)

( * ) Notice: Subject to any disclaimer, the term of this patent is extended or adjusted under 35 U.S.C. 154(b) by 0 days.

(21) Appl. No.: 17/162,847

(22) Filed: Jan. 29, 2021

(30) Foreign Application Priority Data

Sep. 7, 2020 (EP) .................................. 20382793

(51) Int. Cl.
*G05D 16/06* (2006.01)
(52) U.S. Cl.
CPC ..... *G05D 16/0661* (2013.01); *G05D 16/0658* (2013.01); *Y10T 137/7879* (2015.04); *Y10T 137/7888* (2015.04)
(58) Field of Classification Search
CPC ...... F16J 3/02; G05D 16/066; G05D 16/0658; Y10T 137/7895; Y10T 137/7879; Y10T 137/7888
USPC ....................................................... 137/859
See application file for complete search history.

(56) References Cited

U.S. PATENT DOCUMENTS

| 35,146 A | * | 5/1862 | Edson | .................... | B01D 45/02 |
| | | | | | 137/171 |
| 1,938,943 A | * | 12/1933 | Terry | ................. | G05D 16/0658 |
| | | | | | 137/494 |
| 2,061,905 A | * | 11/1936 | Hewitt | ....................... | F16J 3/02 |
| | | | | | 92/103 R |
| 2,067,229 A | * | 1/1937 | Birch | ................ | G05D 16/0655 |
| | | | | | 137/506 |

(Continued)

FOREIGN PATENT DOCUMENTS

| DE | 10123669 A1 | * | 8/2002 | ......... G05D 16/0658 |
| EP | 1793299 A1 | | 6/2007 | |

(Continued)

OTHER PUBLICATIONS

Machine Translation of DE10123669A retrieved Sep. 28, 2021 from espacenet.com (Year: 2021).*

*Primary Examiner* — Jessica Cahill
(74) *Attorney, Agent, or Firm* — Edell, Shapiro & Finnan, LLC

(57) ABSTRACT

According to one embodiment a gas pressure regulator valve is provided that includes a valve body with an inlet gas conduit and an outlet gas conduit, a pressurized gas chamber into which the inlet gas flows after passing through a regulation valve and which is in fluid communication with the outlet gas conduit. The valve also includes a diaphragm having a central protuberance which houses a valve member. A closure cap closes the valve body. Adjusting means is provided for adjusting the regulated nominal pressure of the gas output from the regulator valve. An air chamber and the (Continued)

pressurized gas chamber are delimited in part by the diaphragm which is assembled and fixed between the valve body and the closure cap having the possibility of being axially displaced. The regulator valve further includes a rigid cover which covers the central protuberance, cooperating the cover with the closure cap in the event of an unexpected high pressure of the inlet gas to limit the displacement of the diaphragm.

16 Claims, 10 Drawing Sheets

(56) References Cited

U.S. PATENT DOCUMENTS

| | | | | |
|---|---|---|---|---|
| 2,121,549 | A * | 6/1938 | Meneal | F16K 7/14 137/496 |
| 2,487,415 | A * | 11/1949 | Bennett | F16D 65/00 188/264 B |
| 2,542,254 | A * | 2/1951 | Lamb | B01D 27/10 137/493.8 |
| 3,662,779 | A * | 5/1972 | Weber | G05D 16/0641 137/489 |
| 3,878,680 | A * | 4/1975 | Dauvergne | F01K 21/04 60/511 |
| 10,077,850 | B2 * | 9/2018 | Howell | F16K 7/17 |
| 2011/0048553 | A1 * | 3/2011 | Nakamura | G05D 16/0661 137/528 |
| 2013/0312840 | A1 * | 11/2013 | Young | F16K 31/1221 137/15.19 |
| 2015/0104722 | A1 * | 4/2015 | Rock | F16K 31/1266 429/413 |

FOREIGN PATENT DOCUMENTS

| | | | |
|---|---|---|---|
| JP | 2000207031 A * | 7/2000 | |
| WO | 2017113470 A1 | 7/2017 | |

* cited by examiner

GAS PRESSURE REGULATOR VALVE

CROSS-REFERENCE TO RELATED APPLICATIONS

This application relates to and claims the benefit and priority to European Patent Application No. EP20382793.6, filed Sep. 7, 2020.

TECHNICAL FIELD

The present invention relates to a gas pressure regulator valve of the type comprising a diaphragm.

BACKGROUND

A pressure regulation valve is used to adjust the gas outlet pressure of a gas valve, commonly being used in household appliances, for example in driers. Pressure regulation valves having a diaphragm to regulate the outlet gas of a gas valve are also known. In this sense, EP1793299 A1 discloses a gas pressure regulator valve having a valve body with an inlet gas conduit from a gas source at a variable pressure and an outlet gas conduit for a nominal gas regulated pressure, a closure cap closing the valve body and a diaphragm being assembled and fixed between the valve body and the closure cap having the possibility of being axially displaced. Below the diaphragm it is defined a pressurized gas chamber into which the inlet gas flows after passing through a regulation valve having an adjustable passage hole, the pressurized gas chamber being in fluid communication with the outlet gas conduit. Above the diaphragm it is defined an air chamber which is at atmospheric pressure. The diaphragm comprises a central protuberance which houses a valve member of the regulation valve. The regulator valve of EP1793299 A1 also comprises adjusting means for adjusting the regulated nominal pressure value of the gas output from the regulator valve, said adjusting means pressing on the diaphragm.

SUMMARY

Disclosed is a diaphragm type gas pressure regulator valve. The gas pressure regulator valve is adapted for being used in a household appliance for the supply of a gas flow. The regulator valve comprises a valve body with an inlet gas conduit connected to a gas source at a variable pressure and an outlet gas conduit for a nominal gas regulated pressure, a pressurized gas chamber into which the inlet gas flows after passing through a regulation valve having an adjustable passage hole, the pressurized gas chamber being in fluid communication with the outlet gas conduit, a diaphragm comprising a central protuberance which houses a valve member of the regulation valve, a closure cap closing the valve body and defining an air chamber which is at atmospheric pressure, the air chamber and the pressurized gas chamber being delimited by the diaphragm, and adjusting means for adjusting the regulated nominal pressure value of the gas output from the regulator valve, the adjusting means pressing on the diaphragm. The diaphragm is assembled and fixed between the valve body and the closure cap having the possibility of being axially displaced.

The regulator valve further comprises a rigid cover which covers the central protuberance, and which is arranged between the central protuberance and the adjusting means. The cover cooperates with the closure cap in the event of an unexpected high pressure of the inlet gas to limit the displacement of the diaphragm.

In the event of an unexpected high pressure of the inlet gas, the gas pressure regulator valve is prevented from breaking. The inlet gas pushes the valve member of the regulation valve which at the same time pushes on the central protuberance of the diaphragm. The pushing pressure, in a normal use of the regulator valve, is counteracted by the adjusting means which help to regulate the pressure of the outlet gas of the pressurized gas chamber. However, in case of an unexpected high pressure of the inlet gas, the force exerted by the valve member may excessively deform, and consequently may break, the central protuberance of the diaphragm, causing an undesirable gas leak. But with the cover of the invention, which protects the central protuberance of the diaphragm, the breakdown of the central protuberance of the diaphragm is avoided. The cover cooperates with the closure cap in the event of an unexpected high pressure of the inlet gas, limiting the displacement of the diaphragm upwardly so that the central protuberance cannot be excessively deformed and thus its breakdown is avoided.

These and other advantages and features will become evident in view of the drawings and detailed description.

DETAILED DESCRIPTION

Figure 1:
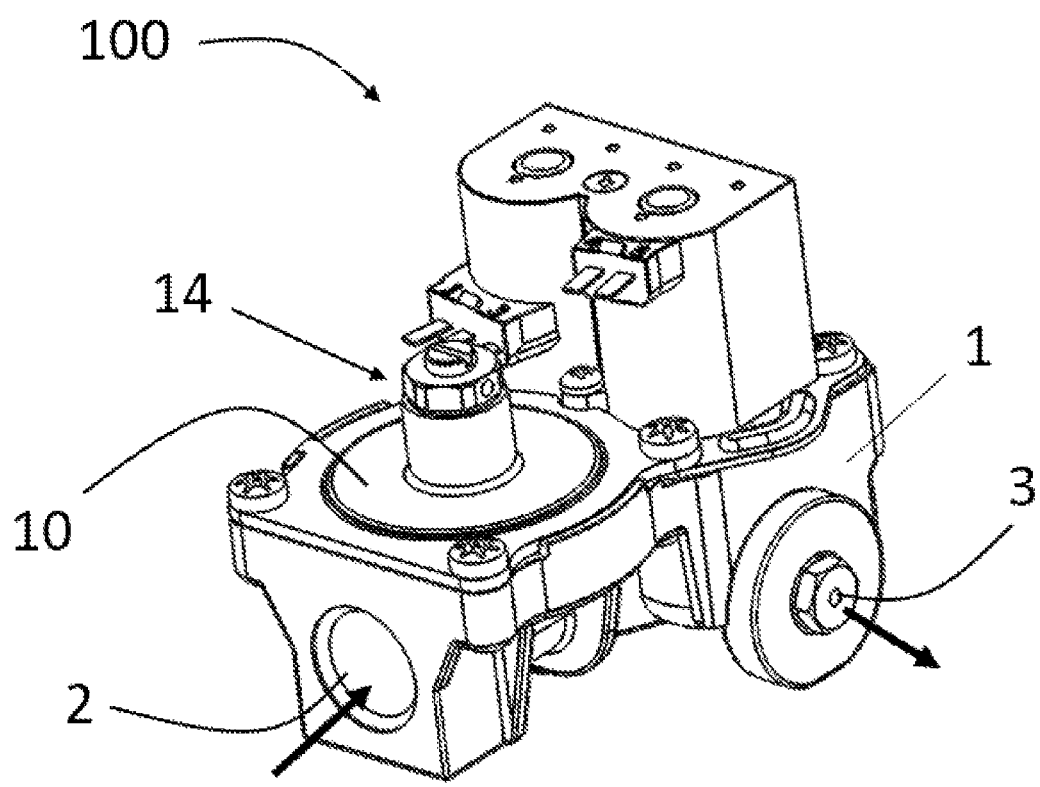
FIG. 1 shows a perspective view of a gas pressure regulator valve according to one embodiment.
Figure 2:
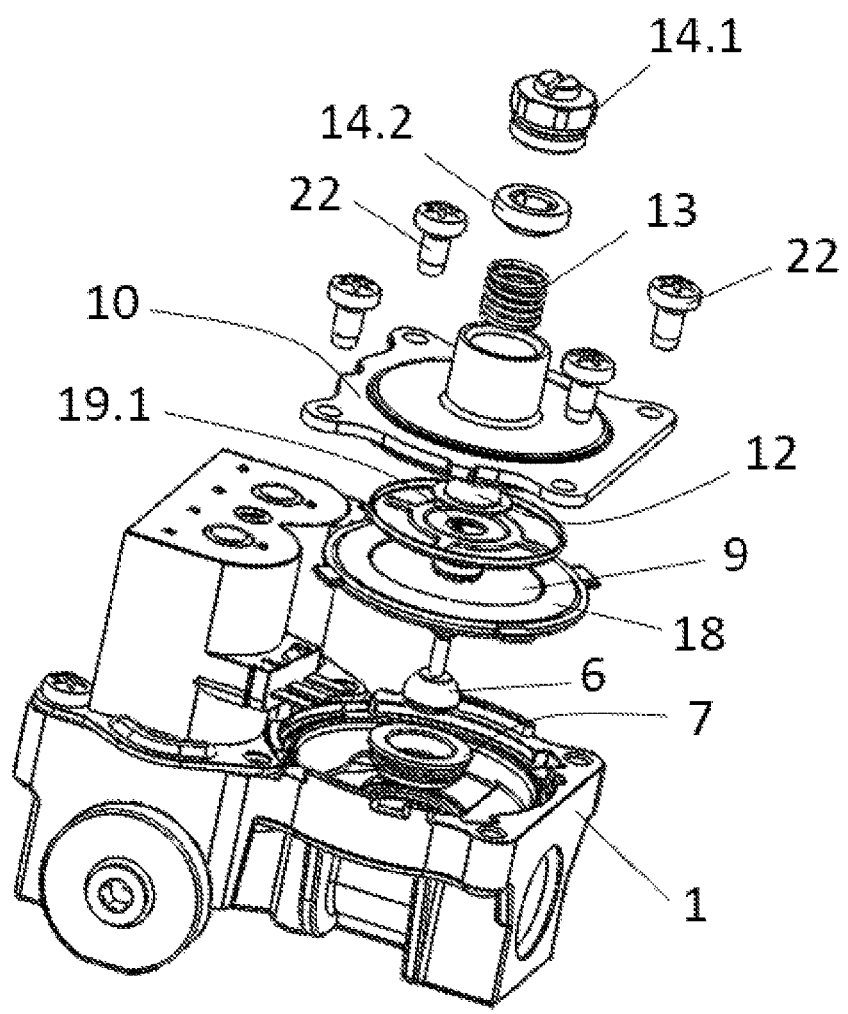
FIG. 2 shows an exploded view of the regulator valve of FIG. 1.
Figure 3:
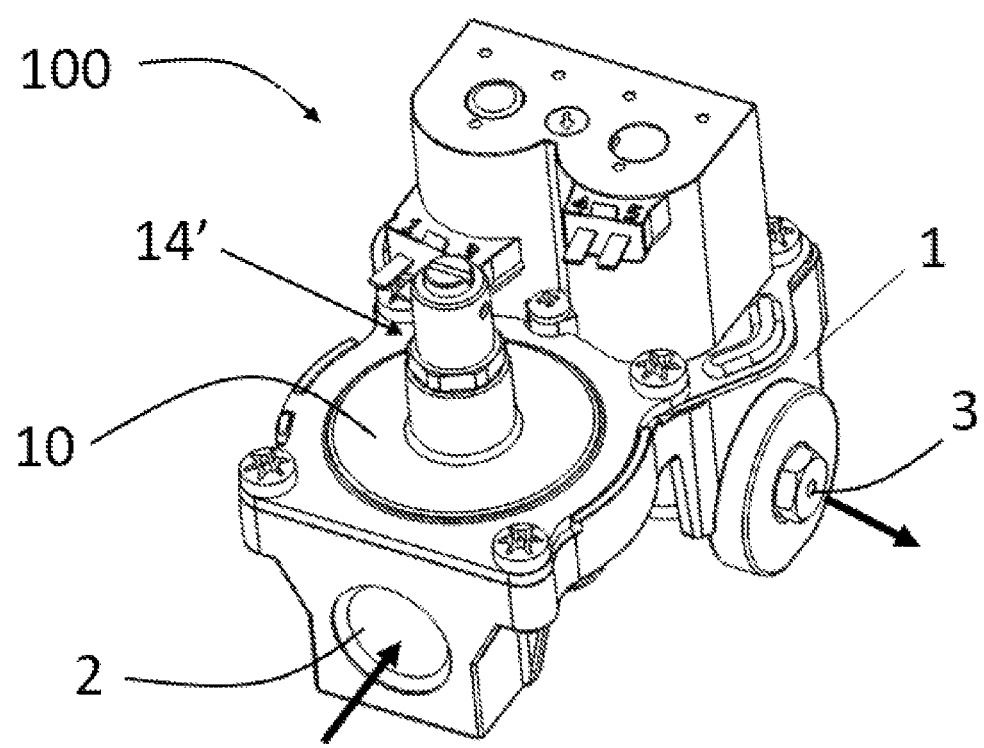
FIG. 3 shows a perspective view of a regulator valve according to another embodiment.
Figure 4:
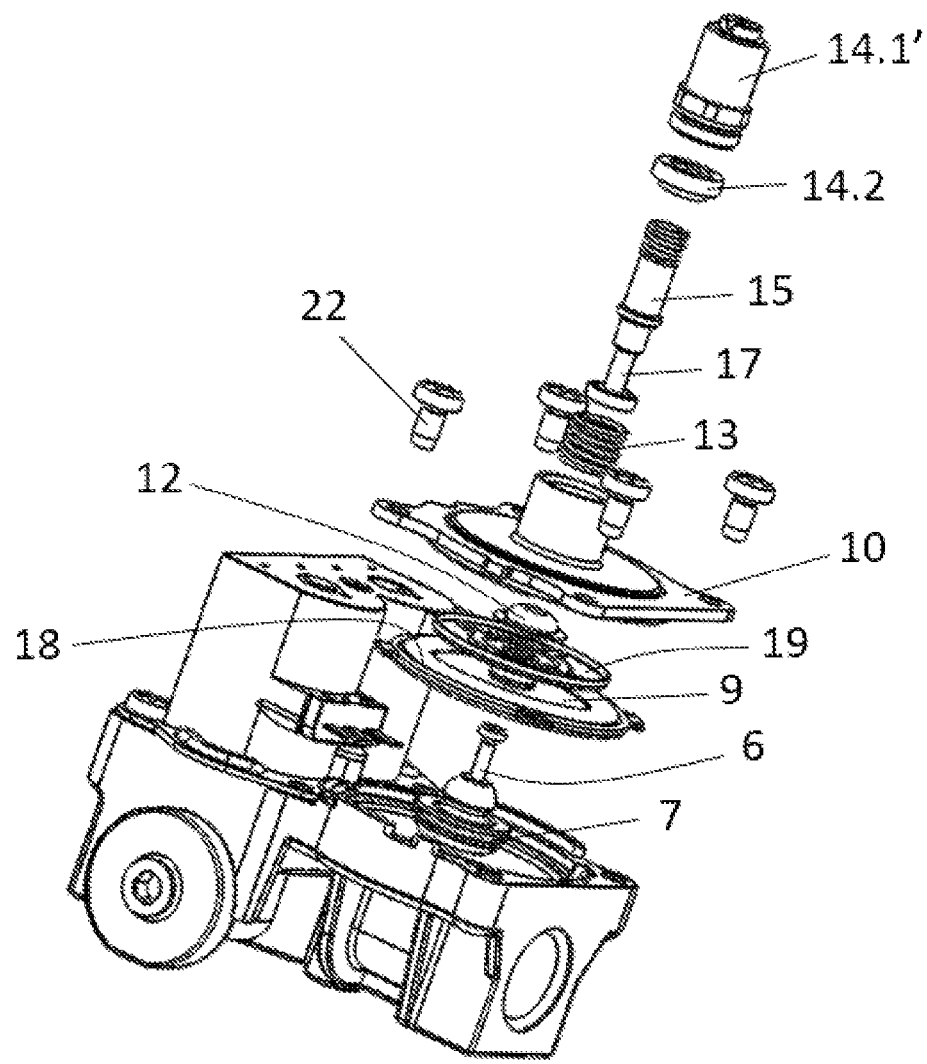
FIG. 4 shows an exploded view of the regulator valve of FIG. 3.

FIGS. 1 and 2 show an embodiment of the gas pressure regulator valve 100 of the invention which is adapted for being use in a household appliance, for example a dryer, for the supply of a gas flow. The regulator valve 100 comprises a valve body 1 with an inlet gas conduit 2 connected to a gas source at a variable pressure Pi and an outlet gas conduit 3 for a nominal gas regulated pressure Pr, a pressurized gas chamber 4 into which the inlet gas flows after passing through a regulation valve 5 having an adjustable passage hole 8, the pressurized gas chamber 4 being in fluid communication with the outlet gas conduit 3, a diaphragm 9 comprising a central protuberance 9.1 which houses a valve member 6 of the regulation valve 5, a closure cap 10 closing the valve body 1 and defining an air chamber 11 which is at atmospheric pressure, the air chamber 11 and the pressurized gas chamber 4 being delimited by the diaphragm 9, and adjusting means for adjusting the regulated nominal pressure value Pr of the gas output from the regulator valve 100, the adjusting means pressing on the diaphragm 9. The diaphragm 9 is assembled and fixed between the valve body 1 and the closure cap 10 having the possibility of being axially displaced. The closure cap 10 is fixedly attached to the valve body 1 using bolts or screws 22, as shown for example in FIG. 5. The peripheral part of the diaphragm 9 is trapped between the valve body 1 and the closure cap 10, as it is shown for example in FIG. 5, being able to axially displace in use the rest of the diaphragm 9.

The regulator valve 100 further comprises a rigid cover 12 which surrounds and covers the central protuberance 9.1 and which is arranged between the central protuberance 9.1 and the adjusting means. The cover 12 cooperates with the closure cap 10 in the event of an unexpected high pressure of the inlet gas to limit the upwardly displacement of the diaphragm 9.

The adjusting means is able to adjust a gas flow of any type of gas, such as natural gas (NG) or liquefied petroleum gas (LPG). When assembling the regulator valve 100 of the invention into the corresponding household appliance, the correct adjusting means must be selected depending on the type of gas supplier of the household appliance, i.e. adjusting means for adjusting a gas from a NG source or from a LPG source.

Figure 5:
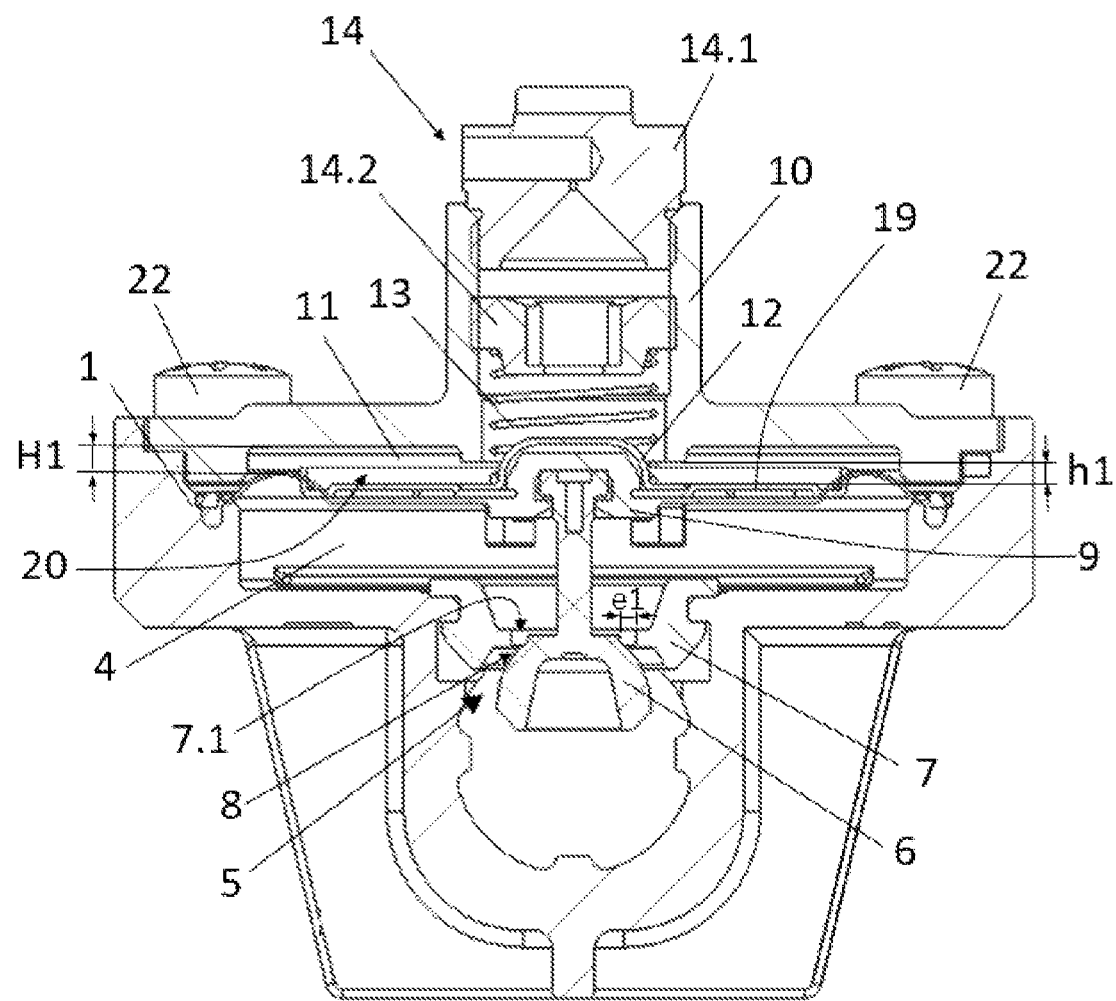
FIG. 5 shows a sectional view of the regulator valve of FIG. 1, with the regulation valve in an open position.
Figure 7:
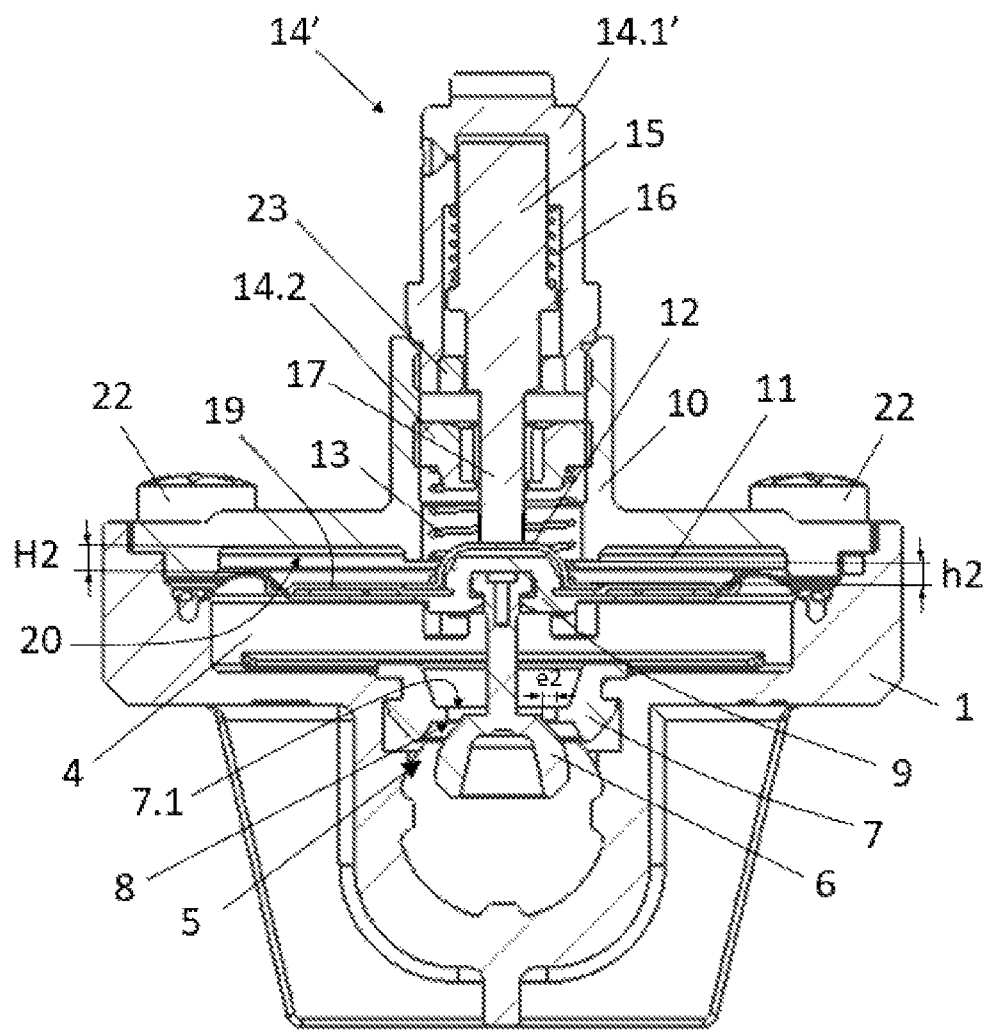
FIG. 7 shows a sectional view of the regulator valve of FIG. 3, with the regulation valve in an open position.

In a rest and stable position of the regulator valve 100, i.e. when no gas is flowing through the inlet gas conduit 2, the adjusting means locate the diaphragm 9 in a nominal working position and the valve member 6 in a position where it defines a nominal opening of the passage hole 8 of the regulation valve 5, as can be seen in FIGS. 5 and 7. Depending on the gas type, NG or LPG, the opening of the adjustable passage hole 8 of the regulation valve 5 is bigger or smaller.

The passage hole 8 is defined as a gap being delimited between a hole 7.1 comprised in a valve seat 7 of the regulation valve 5 and the valve member 6. In use, the opening of the passage hole 8 will vary as described below.

When the regulator valve 100 is in use, the pressure Pi in the inlet conduit 2 of gas, which is variable, tends to displace upwardly the diaphragm 9, i.e. in the direction of closure of the passage hole 8 of the regulation valve 5, and with it the valve member 6. At the same time, the adjusting means exerts a force on the diaphragm 9 in an opposite direction, tending to open the opening of the passage hole 8 of the regulation valve 5, therefore maintaining a constant pressure Pr in the outlet gas conduit 3.

Within a standard working range of the regulator valve 100, which can reach up to 100 millibars for example, the regulation valve 5 is open allowing the passage of the gas towards the pressurized gas chamber 4. If the pressure of the inlet gas raises above the standard working range, then the valve member 6 can block the passage hole 8, as can be seen for example in FIGS. 6 and 8. But if the pressure Pi of the inlet gas increases even more in an unexpected way, exceeding the pressure exerted by the adjusting means and even a pressure which can cause the deformation of the seat valve 7 and/or the valve member 6 near the passage hole 8, for example up to 4 bars or more, the valve seat 7 and/or the valve member 6 can yield and the valve member 6 can be displaced upwardly more than expected, exerting a high force on the center protrusion 9.1 of the diaphragm 9 where the valve member 6 is housed.

In a regulator valve of the prior art, the high force exerted by the valve member 6 may excessively deform, and consequently may break, the central protuberance 9.1 of the diaphragm 9, causing an undesirable gas leak. But with the cover 12 of the invention, which protects the central protuberance 9.1 of the diaphragm 9, the breakdown of the central protuberance 9.1 of the diaphragm 9 is avoided. The cover 12 cooperates with the closure cap 10 in the event of an unexpected high pressure of the inlet gas limiting the upwardly displacement of the diaphragm 9 so that the central protuberance 9.1 cannot be excessively deformed and thus its breakdown is avoided.

Therefore, with the regulator valve 100 it is possible to regulate the pressure of the outlet gas conduit 3 for any gas source, such as NG or LPG, avoiding the rupture of the diaphragm 9, and consequently any undesirable gas leak, in case of a malfunction of the regulator valve 100, so that the safety and reliability of the regulator valve 100 is increased.

Figure 9:
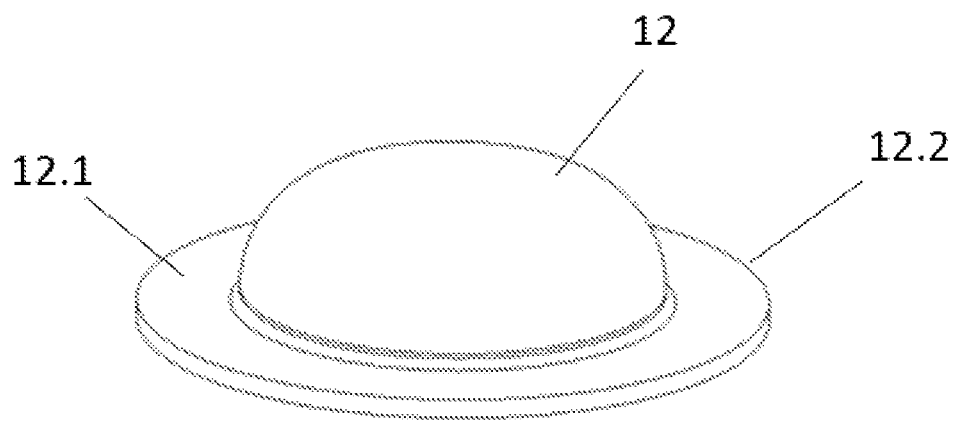
FIG. 9 shows a perspective view of the rigid cover of the regulator valve of FIG. 1.
Figure 10:
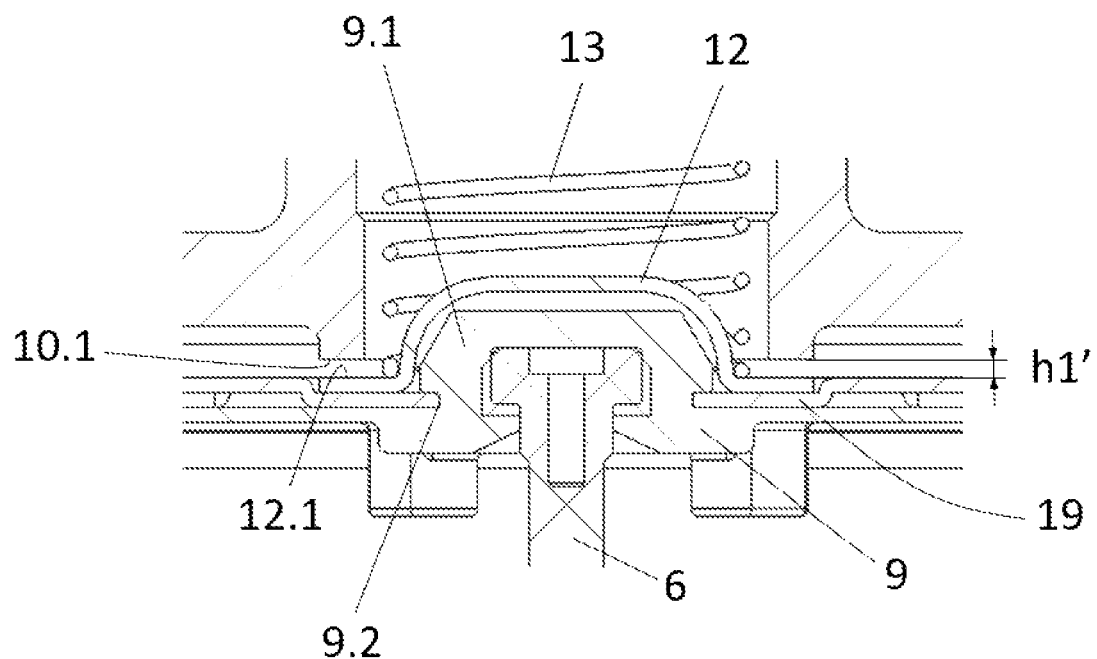
FIG. 10 shows a detail of FIG. 6.
Figure 11:
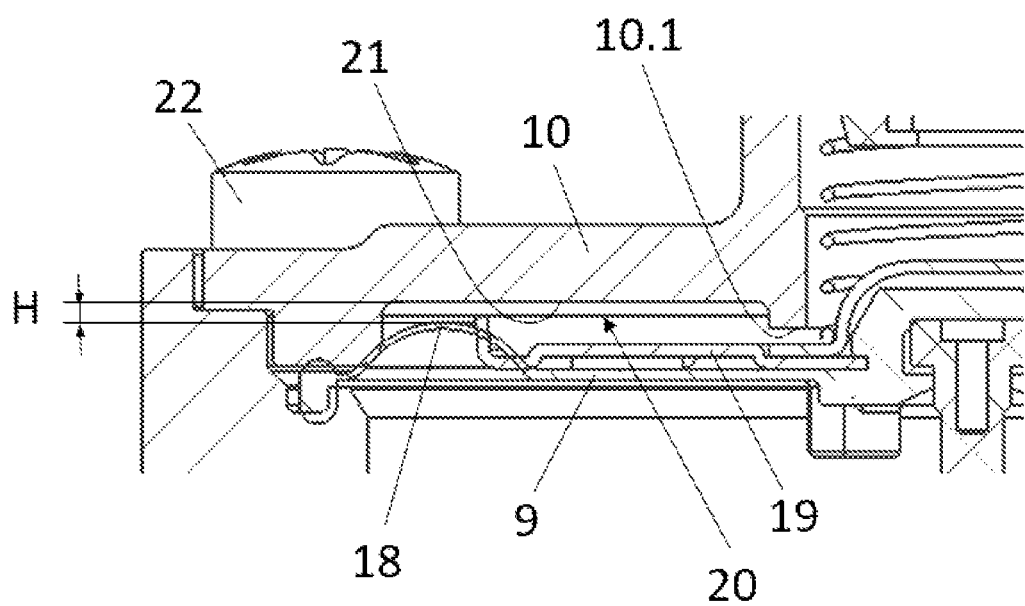
FIG. 11 shows another detail of FIG. 6.

According to one embodiment, the cover 12 comprises a stop surface 12.1, as can be seen in FIG. 9 or 10, and the closure cap 10 comprises another stop surface 10.1, as can be seen in FIG. 10 or 11.

The cover 12 of the regulation valve 100, in use, moves in unison with the diaphragm 9. In a standard use of the regulator valve 100 the stop surface 12.1 of the cover 12 and the stop surface 10.1 of the closure cap 10 do not have to butt each other, but in the event of a malfunction, for example due to an unexpected high pressure Pi of the inlet gas, the stop surface 12.1 of the cover 12 would collide against the stop surface 10.1 of the closure cap 10, avoiding an excess deformation of the center protrusion 9.1 of the diaphragm 9 and thus avoiding the breakdown of diaphragm 9.

According to one embodiment, the cover 12 comprises a dome shape with a rim 12.2 on the bottom extending outwardly, as can be seen in FIG. 9. The stop surface 12.1 of the cover 12 is located in the rim 12.2 and the adjusting means rest on the rim 12.2 of the cover 12.

The diaphragm 9 preferably comprises a thin protrusion 18 located near its periphery, as can be seen in FIG. 11, that provides the diaphragm 9 with a degree of freedom that enables the axial displacement of the diaphragm 9. When the diaphragm 9 is driven upwardly by the pressure Pi of the inlet gas, the thin protrusion 18, which is preferably ring shaped, deforms to allow the diaphragm 9 to be axially displaced. The thin protrusion 18 is preferably thinner than the rest of the diaphragm 9.

The regulator valve 100 preferably further comprises a rigid disc 19 disposed between the protrusion 18 and the central protuberance 9.1 of the diaphragm 9, as shown for example in FIG. 5, 6, 7, 8 or 11. The disc 19 comprises a central hole 19.1, the disc 19 being housed in an outwardly circumferential recess 9.2 of the central protrusion 9.1 of the diaphragm 9, as can be seen for example in FIG. 10. The cover 12 rests on the disc 19, preferably near its central hole 19.1. Like the cover 12, the disc 19 also moves in unison with the diaphragm 9.

The diaphragm 9 is preferably made of rubber or silicone and the disc 19 is preferably made of metal, preferably aluminum or steel, providing the diaphragm 9 with the necessary consistency to move it as a block.

In a preferred embodiment, the cover 12 is also made of metal, preferably aluminum or steel, so that the cover 12 can withstand even the elevated pressure exerted by the central protrusion 9.1 when it is strongly pushed by the valve member 6 in case of a malfunction, for example due to an unexpected high pressure of the inlet gas, avoiding an excessively deformation of the central protrusion 9.1 of the diaphragm 9.

Figure 6:
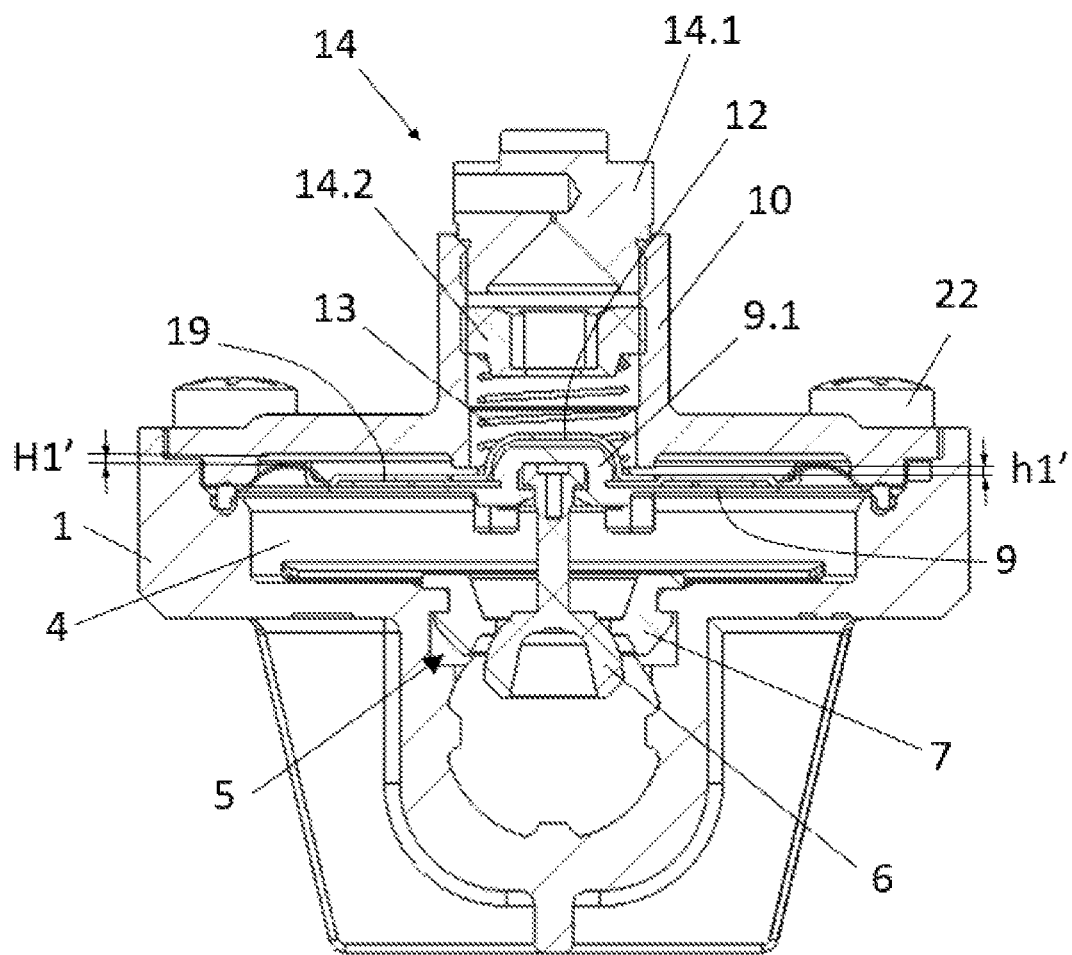
FIG. 6 shows a sectional view of the regulator valve of FIG. 1, with the regulation valve in a closed position.
Figure 8:
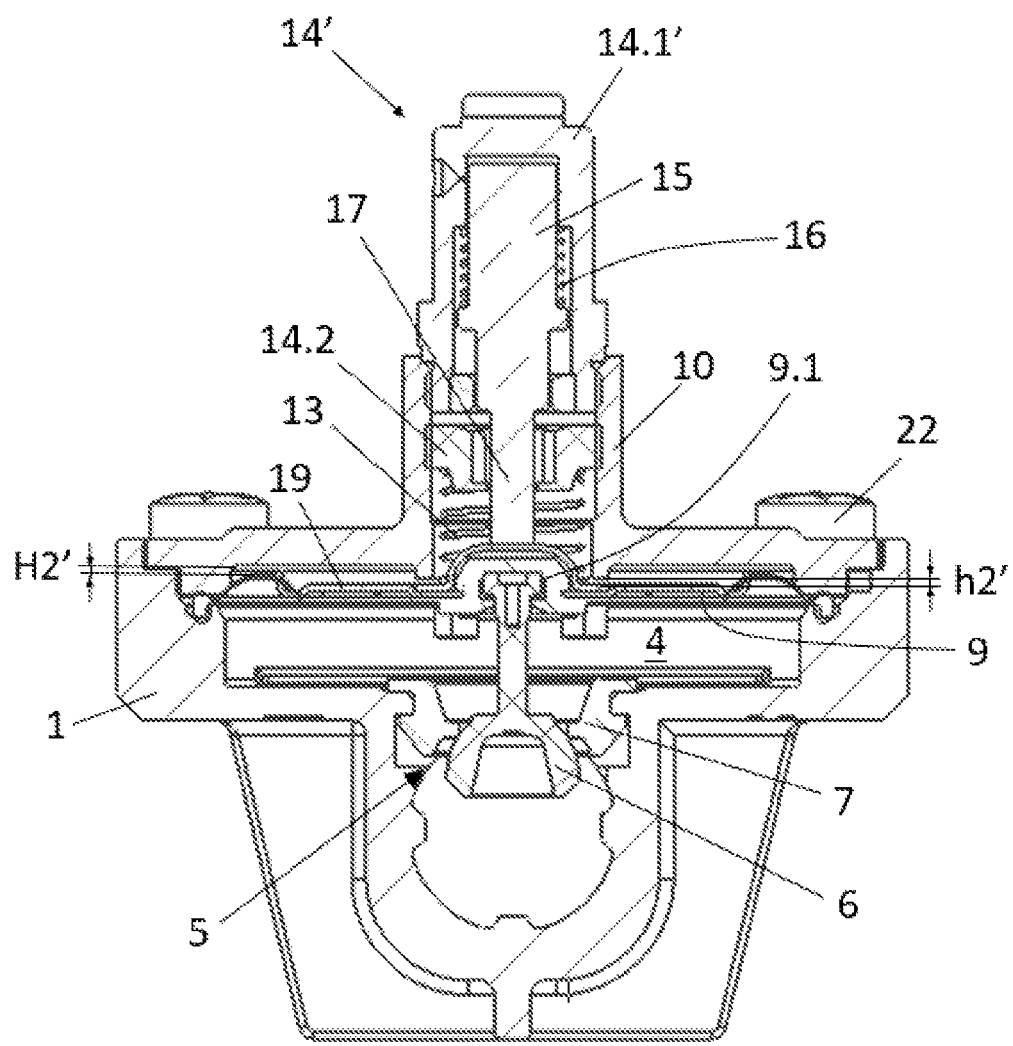
FIG. 8 shows a sectional view of the regulator valve of FIG. 3, with the regulation valve in a closed position.

As can be seen for example in FIG. 11, the closure cap 10 preferably comprises a recess 20 on the bottom, the protrusion 18 of the diaphragm 9 being located under the recess 20 leaving a gap H so that the diaphragm 9 can move axially. The gap H is measured from the top of the protrusion 18 till a wall 21 of the recess 20. When the inlet gas conduit 2 is connected to a NG source, the gap H is referred as H1, as can be seen in FIG. 5, and when it is connected to a LPG source the gap H is referred as H2, as can be seen in FIG. 7. When the regulator valve 100 is connected to a NG source, the gap H1 of FIG. 5 corresponds to a gap formed when the valve regulation valve 5 is in the rest and stable position, i.e. when no gas is flowing through the inlet gas conduit 2 so that the diaphragm 9 is in the nominal working position, and the gap referred as H1' corresponds to a different possible gap formed when the diaphragm 9 is not in the nominal working position. The gap H1' represented in FIG. 6 is the gap formed when the regulation valve 5 is blocked. H1' can be the gap represented in FIG. 6 or even zero millimeters, i.e. the protrusion 18 of the diaphragm 9 butting the wall 21 of the recess 20. When the regulator valve 100 is connected to a LPG source, the gap H is referred as H2 and corresponds to a gap formed when the valve regulation valve 5 is in the rest and stable position as shown in FIG. 7, while the gap H2' corresponds to a different possible gap formed when the diaphragm 9 is not in the nominal position. The gap H2' represented in FIG. 8 is the gap formed when the regulation valve 5 is blocked, which can also be zero.

In the event of an unexpected high pressure Pi of the inlet gas, the protrusion 18 of the diaphragm 9 will butt against the wall 21 of the recess 20, limiting also the axial displacement of the diaphragm 9 and avoiding an excess deformation of the protrusion 18, so that the rupture of the diaphragm 9 in this section can also be avoided.

The adjusting means preferably comprise a pre-stressed adjusting spring 13 which rests on the cover 12, preferably on the rim 12.2, near the stop surface 12.1 of the cover 12, as can be seen in the detail of FIG. 10. The adjusting spring 13 is retained and compressed by an adjusting pusher 14 or 14' which is threaded in the closure cap 10, as can be seen in FIGS. 5 to 8.

In the preferred embodiment, the adjusting pusher 14, which is adapted to regulate the outlet gas pressure Pr of a NG gas, comprises a threaded nut 14.2 cooperating with the adjusting spring 13 and which is threaded in the closure cap 10. The threaded nut 14.2 pushes and therefore compresses the adjusting spring 13 and, as a result, the adjusting spring 13 pushes the diaphragm 9. The adjusting pusher 14 further comprises a threaded plug 14.1, also threaded in the closure cap 10, which protects the adjusting pusher 14. After locating the threaded nut 14.2 in the desired position to pre-stress the adjusting spring 13, the threaded plug 14.1 is placed to close the closure cap 10. The force applied by the adjusting pusher 14 to pre-stress the adjusting spring 13 is regulated by a specialized technician taking into account the type of the source of the inlet gas, usually once in the lifetime of the household appliance and preferably during the assembly of the household appliance, unless the type of the source of the inlet gas is changed.

As stated above, when the regulator valve 100 is in the rest and stable position, the adjusting means locate the diaphragm 9 in the predetermined nominal working position and the valve member 6 in the predetermined position where a nominal opening of the passage hole 8 of the regulation valve 5 is defined. Where the source of the inlet gas is a NG source, the adjusting means define a nominal working position of the diaphragm 9 where the distance between the stop surface 10.1 of the closure cap 10 and the stop surface 12.1 of the cover 12 is a first displacement h1, as can be seen in FIG. 5. At the nominal working position of the diaphragm 9, an opening of the adjustable passage hole 8 of the regulation valve 5 is defined where the predetermined transversal gap e1 between the valve member 6 and the valve seat 7 of the regulation valve 5 is defined to allow the pass of the inlet gas, in this case NG type, from the inlet gas conduit 2 towards the pressurized gas chamber 4, as can be seen in FIG. 5. In the sense of the invention, transversal means perpendicular to the axial direction of the regulator valve 100.

In use, the displacement h1 between the stop surface 10.1 of the closure cap 10 and the stop surface 12.1 of the cover 12 and the gap e1 between the valve member 6 and the valve seat 7 of the regulation valve 5 vary. Under a standard use of the regulator valve 100 of the invention, the displacement h1 will not be zero.

Where the source of the inlet gas is a LPG source, the adjusting means defines another nominal working position of the diaphragm 9 where the distance between the stop surface 10.1 of the closure cap 10 and the stop surface 12.1 of the cover 12 is a second displacement h2, as can be seen in FIG. 7. At the nominal working position, another opening of the adjustable passage hole 8 of the regulation valve 5 is defined where another predetermined transversal gap e2 between the valve member 6 and the valve seat 7 of the regulation valve 5 is defined to allow the passing of the inlet gas, in this case LPG type, from the inlet gas conduit 2 towards the pressurized gas chamber 4, as can be seen in FIG. 7.

To further axially displace the diaphragm 9 when the source of the inlet gas is a LPG source, the adjusting pusher 14' preferably further comprises a bolt 15, the upper part of the bolt 15 being preferably housed in the threaded plug 14.1' through another adjusting spring 16. The bolt 15 preferably comprises a stem 17 in the bottom part that goes through the threaded nut 14.2 and the adjusting spring 13 of the adjusting means. The stem 17 pushes the cover 12 providing an extra displacement of the diaphragm 9, apart from the one provided by the threaded nut 14.2, which at the same time provides an extra displacement of the valve member 6 of the regulation valve 5. Therefore, the nominal axial distance h2 between the stop surface 10.1 of the closure cap 10 and the stop surface 12.1 of the cover 12 and the gap e2 between the valve member 6 and the valve seat 7 of the regulation valve 5 when the inlet gas is a LPG source are bigger than when the inlet gas is a NG source. The threaded plug 14.1' preferably comprises a stopper 23 in the bottom part to limit the displacement of the bolt 15 in case of a malfunction of the regulator valve 100.

In case that the inlet gas is LPG the force exerted by the adjusting means on the diaphragm 9 is not derived only by the adjusting spring 13 but also by the second adjusting spring 16 of the bolt 15.

The adjusting spring 16 of the adjusting pusher 14' of this last embodiment allows the displacement of the diaphragm 9 if necessary so that a regulation regime, i.e. where the pressure Pr in the outlet gas conduit 3 is maintained constant, can also be obtained even in case that the source of the inlet gas is a LPG source. Therefore, with the same regulator valve 100 it is possible to regulate the outlet gas of a NG source or a LPG source just changing the corresponding threaded plug 14.1 or 14.1'.

FIG. 5 shows the distance h1 between the stop surface 12.1 of the cover 12 and the stop surface 10.1 of the closure cap 10 when the diaphragm 9 is in the nominal working position and the passage hole 8 is also in its nominal opening position when the inlet gas conduit 2 is connected to a NG source. FIG. 6 shows the distance h1' between the stop surface 12.1 of the cover 12 and the stop surface 10.1 of the closure cap 10 but when the passage hole 8 is not in the nominal open position, h1' being smaller than h1. Specifically, FIG. 6 represents the distance h1' where the diaphragm 9 is in a position in which the regulation valve 5 is blocked. FIG. 7 and FIG. 8 represent the same as FIG. 6 and FIG. 7 respectively, but for an inlet gas conduit 2 connected to a LPG source, FIG. 7 and FIG. 8 showing h2 and h2' respectively.

The following clauses disclose additional embodiments.

Clause 1. Diaphragm type gas pressure regulator valve adapted to a household appliance for the supply of a gas flow, comprising:
- a valve body (1) with an inlet gas conduit (2) connected to a gas source at a variable pressure (Pi) and an outlet gas conduit (3) for a nominal gas regulated pressure (Pr),
- a pressurized gas chamber (4) into which the inlet gas flows after passing through a regulation valve (5) having an adjustable passage hole (8), said pressurized gas chamber (4) being in fluid communication with the outlet gas conduit (3),
- a diaphragm (9) comprising a central protuberance (9.1) which houses a valve member (6) of the regulation valve (5),
- a closure cap (10) closing the valve body (1) and defining an air chamber (11) which is at atmospheric pressure, the air chamber (11) and the pressurized gas chamber (4) being delimited by the diaphragm (9), and
- adjusting means for adjusting the regulated nominal pressure value (Pr) of the gas output from the regulator valve (1), said adjusting means pressing on the diaphragm (9),
- the diaphragm (9) being securely assembled and fixed between the valve body (1) and the closure cap (10) having the possibility of being axially displaced,
- the regulator valve (100) further comprises a rigid cover (12) covering the central protuberance (9.1) and which is arranged between said central protuberance (9.1) and the adjusting means, the cover (12) cooperating with the closure cap (10) in the event of an unexpected high pressure of the inlet gas (Pi) to limit the displacement of the diaphragm (9).

Clause 2. Gas pressure regulator valve according to clause 1, wherein the cover (12) moves in solidarity with the diaphragm (9).

Clause 3. Gas pressure regular valve according to clause 1 or 2, wherein the cover (12) comprises a stop surface (12.1) and the closure cap (10) comprises another stop surface (10.1), so that in the event of the unexpected high pressure of the inlet gas (Pi) the stop surface (12.1) of the cover (12) butts against the stop surface (10.1) of the closure cap (10).

Clause 4. Gas pressure regulator valve according to clause 3, wherein the cover (12) comprises a dome shape with a rim (12.2) on the bottom extending outwardly, the stop surface (12.1) of the cover (12) being located in said rim (12.2).

Clause 5. Gas pressure regulator valve according to clause 4, wherein the adjusting means rest also on the rim (12.2) of the cover (12).

Clause 6. Gas pressure regulator valve according to any of the preceding clauses, wherein the diaphragm (9) comprises a protrusion (18) near its periphery that provides the diaphragm (9) with a degree of freedom that enables the axial displacement of the diaphragm (9) when the regulator valve (100) is in use.

Clause 7. Gas pressure regulator valve according to clause 6, wherein the regulator valve (100) further comprises a rigid disc (19) disposed between the protrusion (18) and the central protuberance (9.1) of the diaphragm (9), the cover (12) resting on said disc (19), the rigid disc (19) moving in solidarity with the diaphragm (9).

Clause 8. Gas pressure regulator valve according to clause 6 or 7, wherein the closure cap (10) comprises a recess (20) on the bottom, the protrusion (18) of the diaphragm (9) being located under said recess (20) leaving a gap (H) that allows the axial displacement of the diaphragm (9).

Clause 9. Gas pressure regulator valve according to clause 8, wherein, in the event of an unexpected high pressure of the inlet gas (Pi), the protrusion (18) of the diaphragm (9) butts against a wall (21) of the recess (20) limiting the axial displacement of the diaphragm (9).

Clause 10. Gas pressure regulator valve according to any of the preceding clauses, wherein the adjusting means provide a predetermined transversal gap (e1; e2) between the valve member (6) and a valve seat (7) of the regulation valve (5) to allow the pass of the inlet gas from the inlet gas conduit (2) towards the pressurized gas chamber (4), said gap (e1; e2) being able to vary when the regulator valve (100) is in use.

Clause 11. Gas pressure regulator valve according to any of the preceding clauses, wherein the adjusting means are able to adjust a gas flow of NG or LPG.

Clause 12. Gas pressure regulator valve according to clause 11, wherein the adjusting means comprise a pre-stressed adjusting spring (13) resting on the cover (12), so that the adjusting spring (13) presses on the diaphragm (9) through the cover (12), said adjusting spring (13) being retained and compressed by an adjusting pusher (14; 14') which is threaded in the closure cap (10).

Clause 13. Gas pressure regulator valve according to clause 12, wherein the adjusting pusher (14; 14') comprises a threaded nut (14.2) cooperating with the adjusting spring (13) and a threaded plug (14.1; 14.1') located upstream of the threaded nut (14.2), both the threaded nut (14.2) and the threaded plug (14.1; 14.1') being threaded in the closure cap (10).

Clause 14. Gas pressure regulator valve according to clause 13, wherein the adjusting pusher (14') further comprises a bolt (15), the upper part of said bolt (15) being housed in the threaded plug (14.1') through another adjusting spring (16), the bolt (15) having a stem (17) in the bottom part that goes through the adjusting means, the stem (17) being able to push the cover (12) when the inlet gas is of the LPG type so that the bolt (15) presses also on the diaphragm (9) through the cover (12).

Clause 15. Gas pressure regulator valve according to any of the preceding clauses, wherein the cover (12) is made of metal, preferably aluminum or steel.

Clause 16. Gas pressure regulator valve according to any of the preceding clauses, wherein the closure cap (10) is attached to the valve body (1), preferably by bolts or screws (22).

Clause 17. A dryer comprises a gas pressure regulator valve (100) according to any of the preceding clauses.

What is claimed is:

1. A gas pressure regulator valve for regulating a pressure of a gas, the gas pressure regulator valve comprising:
    a valve body including an inlet gas conduit and an outlet gas conduit;
    a gas chamber disposed between and in fluid communication with the inlet gas conduit and the outlet gas conduit;
    a regulation valve including a valve member that is moveable with respect to a valve seat to alter a size of an opening disposed between the inlet gas conduit and the gas chamber;

a diaphragm that includes a central protuberance that houses a first part of the valve member, the diaphragm having a peripheral region that includes a protrusion that provides the diaphragm with a degree of axial freedom of movement when the gas pressure regulator valve is in use;

a closure cap closing the valve body and defining an air chamber at atmospheric pressure, each of the air chamber and the gas chamber being delimited at least in part by the diaphragm, the diaphragm being fixed between the valve body and the closure cap having the possibility of being axially displaced;

an adjusting spring configured to cause the application of an axial force on the diaphragm for controlling a nominal pressure value of the gas at the output gas conduit when the gas pressure regulator valve is in use;

a rigid cover covering the central protuberance, the rigid cover being arranged between the central protuberance and the adjusting spring, the rigid cover configured to cooperate with the closure cap to limit axial movement of the central protuberance upon the gas delivered to the gas inlet conduit being at an excessive pressure; and a rigid disc disposed between the protrusion and the central protuberance of the diaphragm, the rigid cover resting on the rigid disc, the rigid disc configured to move in unison with the diaphragm, the rigid disc having a central hole that is housed in an outwardly circumferential recess of the central protrusion of the diaphragm.

2. The gas pressure regulator valve according to claim 1, wherein the rigid cover is configured to move axially in unison with the central protuberance of the diaphragm.

3. The gas pressure regulator valve according to claim 1, wherein the rigid cover includes a first stop surface and the closure cap includes a second stop surface, the first stop surface being configured to butt against the second stop surface upon the gas delivered to the gas inlet conduit being at the excessive pressure.

4. The gas pressure regulator according to claim 3, wherein a gap exists between the first and second stop surfaces upon the gas being delivered to the gas inlet conduit at a non-excessive pressure.

5. The gas pressure regulator valve according to claim 3, wherein the rigid cover comprises a dome and a rim extending radially outward from a bottom of the dome, the first stop surface being located on the rim.

6. The gas pressure regulator valve according to claim 5, wherein at least a portion of the adjusting spring rests on the rim.

7. The gas pressure regulator valve according to claim 1, wherein a bottom of the closure cap comprises a recess, the protrusion of the diaphragm being located under the recess with a gap existing between a wall defining the recess and the protrusion.

8. The gas pressure regulator valve according to claim 7, wherein upon the gas being delivered to the gas inlet conduit at the excessive pressure, the protrusion of the diaphragm butts against the wall of the recess limiting the axial freedom of movement of the diaphragm.

9. The gas pressure regulator valve according to claim 1, wherein the adjusting spring exerts a pressure on the diaphragm to cause the opening disposed between the inlet gas conduit and the gas chamber to be opened a predetermined amount to allow a passing of the gas from the inlet gas conduit towards the gas chamber, the size of the opening being able to vary when the gas pressure regulator valve is in use.

10. The gas pressure regulator valve according to claim 1, wherein the gas is selected from the group consisting of natural gas and liquefied petroleum gas.

11. The gas pressure regulator valve according to claim 1, wherein the adjusting spring comprises a pre-stressed first adjusting spring resting on the rigid cover, so that the first adjusting spring presses on the diaphragm through the rigid cover.

12. The gas pressure regulator valve according to claim 11, wherein the first adjusting spring is retained and compressed by an adjusting pusher that is threaded in the closure cap.

13. The gas pressure regulator valve according to claim 12, wherein the adjusting pusher comprises a threaded nut cooperating with the first adjusting spring and a threaded plug, the threaded nut and the threaded plug being threaded in the closure cap.

14. The gas pressure regulator valve according to claim 13, wherein the adjusting pusher further comprises a bolt, the upper part of the bolt being housed in the threaded plug and passing through a second adjusting spring separate and distinct from the first adjusting spring, a bottom of the bolt having a stem that passes through the adjusting spring, the stem being configured to push on the rigid cover when the gas is liquefied petroleum gas so that the bolt presses also on the diaphragm through the rigid cover.

15. The gas pressure regulator valve according to claim 1, wherein the rigid cover is made of a metal.

16. The gas pressure regulator valve according to claim 1, wherein the closure cap is attached to the valve body.

* * * * *